(I)

(II)

(III)

United States Patent Office 3,444,273
Patented May 13, 1969

---

3,444,273
MOLECULAR COMPOUNDS OF O,O-DIMETHYL-CARBAMOYLMETHYL DITHIOPHOSPHATE AND AN ALKYL PHENOL
Noboru Muramoto, Toyonaka-shi, Keimei Fujimoto, Kyoto, and Yositosi Okuno, Nishinomiya-shi, Japan, assignors to Sumitomo Chemical Company, Ltd., Osaka, Japan, a corporation of Japan
Filed June 13, 1966, Ser. No. 556,952
Int. Cl. C07f 9/16; A01n 9/36
U.S. Cl. 260—943        4 Claims

ABSTRACT OF THE DISCLOSURE

Molecular compounds of O,O-dimethyl N-methylcarbamoylmethyl dithiophosphate and an alkyl phenol having the formula

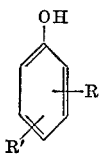

Figure 1:
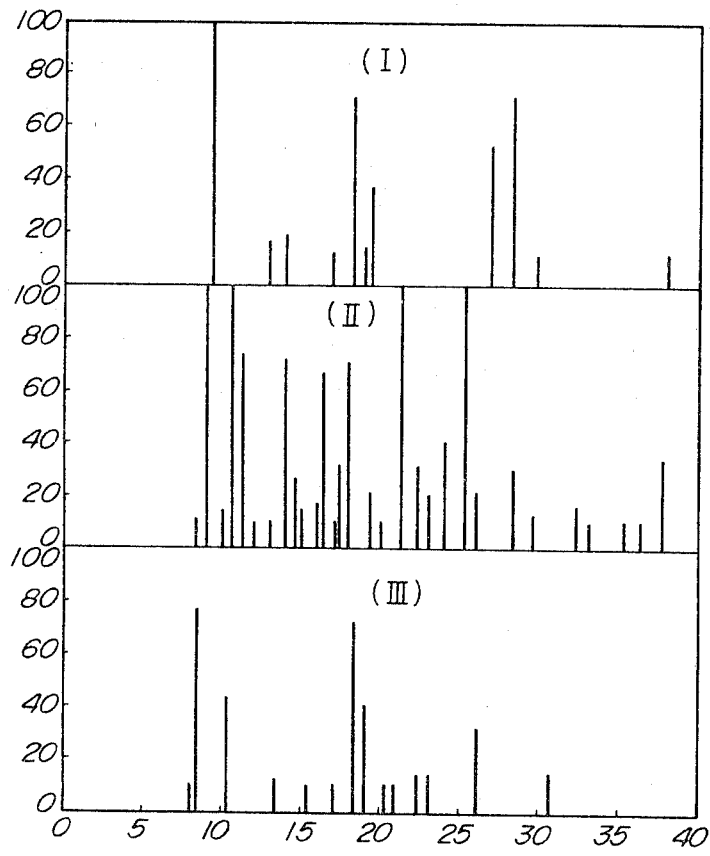
Figure 1:
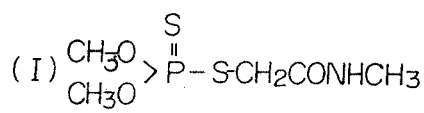
Figure 1:
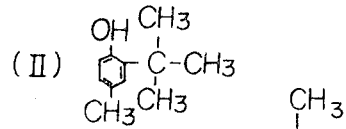
Figure 1:
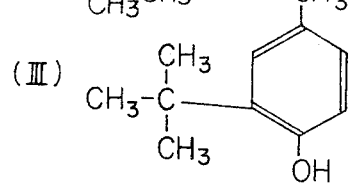
Figure 1:
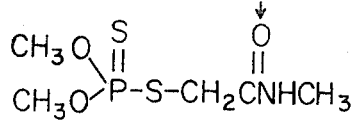

wherein R is a branched alkyl group having 3 or 4 carbon atoms and $R^1$ is methyl or methoxy group. These compounds are stable and are particularly useful as the active ingredient in insecticidal compositions.

---

The present invention relates to an insecticidal composition comprising a novel molecular compound of O,O-dimethyl N-methylcarbamoylmethyl dithiophosphate. More particularly, the invention relates to an insecticidal composition comprising a novel molecular compound of O,O-dimethyl N-methylcarbamoylmethyl dithiophosphate of the formula,

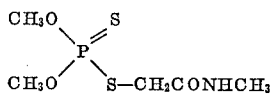

with an alkyl phenol of the formula,

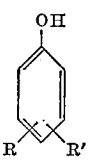

wherein R is a branched alkyl group having 3 or 4 carbon atoms and R' is a member selected from the group consisting of methyl and methoxy radicals. Hitherto, O,O-dimethyl N-methylcarbamoylmethyl dithiophosphate, in spite of having an excellent insecticidal activity, has not been widely accepted because of the various unsolved questions in connection with the formulation thereof. For example, the following are named out as the drawbacks of the compound and the questions on its formation still remain unsolved up to the time.

(1) Since the compound is relatively unstable, especially in the presence of mineral carrier such as, for example, talc and clay, the composition formulated with such a carrier tends to be easily decomposed, hence it is impossible to store the composition for a long duration of time.

(2) Since the compound per se and accordingly the composition thereof possess an undesirable odor, it is difficult to handle in practice.

(3) Since the compound possesses a higher water-solubility, the formulated composition, e.g. granular or dust formulation, applied to the soil, is easily washed away in a shorter period of time, for instance, by rainwater or subterranean water.

Needless to say, the above mentioned drawbacks are all derived from the physical and chemical properties of O,O-dimethyl N-methylcarbamoylmethyl dithiophosphate per se, therefore the key to the questions is how to improve the properties of the compound itself.

Accordingly, an object of the present invention is to provide a novel molecular compound of O,O-dimethyl N-methylcarbamoylmethyl dithiophosphate having an improved stability and being fit for use in making a stable composition which can be stored for a long duration of time under practical conditons.

Another object of the invention is to provide a novel molecular compound of O,O-dimethyl N-methylcarbamolymethyl dithiophosphate having a diminished undesirable odor and being fit for use in the control of household pests. Still another object of the invention is to provide a novel molecular compound of O,O-dimethyl N-methylcarbamolymethyl dithiophosphate having a reduced water solubility and an improved residual effect in the soil. A further object of the invention is to provide a useful insecticidal composition containing the above-mentioned novel molecular compound of O,O-dimethyl N-methylcarbamoylmethyl dithiophosphate as an active ingredient. Still further object of the invention is to provide a process for producing a novel molecular compound of O,O-dimethyl N-methylcarbamoylmethyl dithiophosphate without loss of its insecticidal activity. Other objects of the invention will be apparent from the description of this specification and the claims hereinafter described.

In the present invention, it has been found that O,O-dimethyl N-methylcarbamoylmethyl dithiophosphate can be converted into a stable molecular compound by contacting O,O-dimethyl N-methylcarbamoylmethyl dithiophosphate with an alkyl phenol represented by the following general formula,

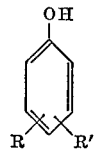

wherein R and R' have the same meanings as defined above. Further surprising is the finding that all of the aforesaid objects can be attained by the provision of the said molecular compound of O,O-dimethyl N-methylcarbamoylmethyl dithiophosphate with the alkyl phenol compound.

Thus, taking a different position from the conventional approaches to overcome the drawbacks of the compound the characteristic of the present invention is to utilize the unique properties of the novel molecular compound obtained by contacting O,O-dimethyl N-methylcarbamoylmethyl dithiophosphate with said substituted phenol compound.

According to the infrared absorption spectrum of the present molecular compound, it is apparent that oxygen atom in the carbamoyl moiety of the said phosphate is combined in an equimolar amount ratio with the hydroxy radical of the said alkyl phenol by means of a hydrogen bond.

The alkyl phenol compounds employed in the present invention are characterized in having at least one branched alkyl group containing 3 to 4 carbon atoms, and one methyl or methoxy group. These conditions are empirically determined by the present inventors as the indispensable conditions for keeping the intermolecular bonding of the compound in an appropriate state and for giving an improved stability and a diminished water solubility. The molecular compound thus obtained by the method of this invention has scarcely any undesirable odor and hygroscopicity. This compound also possesses an excellent thermal stability and can be recrystallized from such solvents as water, alcohol, xylene and perchloroethylene. These are indeed the characteristics of the present molecular compound, since the similar compound obtained by contacting O,O-dimethyl N-methylcarbamoylmethyl dithiophosphate with a phenol compound having no branched alkyl group such as phenol, cresol and xylenol, does not possess such properties. In most cases, they are hygroscopic liquids having inferior thermal stability.

In consideration to increase of molecular weight, the novel molecular compounds of the present invention have the same insecticidal effectiveness as O,O-dimethyl N-methylcarbamoylmethyl dithiophosphate, besides with relatively low toxicity to mammals compared with the said phosphate, especially the molecular compound consisting of the said phosphate and 4-methyl-2-tert.-butyl-phenol with a half toxicity of the said phosphate to mammals, and have excellent sterilizing effect toward a wide variety of pathogenic bacteria. Hence, they may be employed for one of the ideal household pesticides and useful disinfectants. Other properties such as an excellent systemic action into a plant, a diminished water solubility and an improved stability, make the present molecular compound a very useful novel agricultural chemical.

In a preferred embodiment of the invention, O,O-dimethyl N-methylcarbamoylmethyl dithiophosphate is directly mixed with an equimolar amount of alkyl phenol defined above and the mixture is ground well to effect the uniform admixing of the both components. If desired, the mixture may be heated to aid the uniform mixing thereof. In this case, an applying temperature needs not be too high to secure a complete melt of these components since the heating is a supplementary means to aid the reaction between them. Usually, a temperature of not more than 60° C. may be advantageously employed. After cooling, the resulting solidified mass may be pulverized and mixed together with an inert carrier to make an appropriate formulation thereof. Alternatively, the fused mixture may be directly added with an inert carrier or sprayed into ice-water through a narrow opening to precipitate out the fine particles of the product. In another preferred embodiment of the invention, O,O-dimethyl N-methylcarbamoylmethyl dithiophosphate and almost equivalent amount of alkyl phenol are heated in the presence of a small amount of solvent, and the mixed solution is then cooled to precipitate out the crystals, followed by filtration, thereby to obtain the present molecular compound. In this case, the crystals isolated from the mother liquid are always of the equimolecular composition of these components even though somewhat differential amounts of reactants are employed therein, hence to employ equivalent amount of the said phosphate and the said alkyl phenol is not always of indispensable condition in this reaction. The melting point of thus produced molecular compound may widely vary with the kind of employed alkyl phenol. For example, the melting point of the molecular compound obtained by contacting 4-methyl-2-tert.-butyl phenol (M.P. 53° C.) with O,O-dimethyl N-methylcarbamoylmethyl dithiophosphate (M.P. 51° C.) is about 58° C. which is substantially higher than those of the employed raw materials. However, the melting points of the similar molecular compounds derived from 4-methoxy-2-tert.-butyl phenol and from 3-methyl-6-isopropyl phenol are 43.5° C. and 33° C. respectively.

Figure 2:
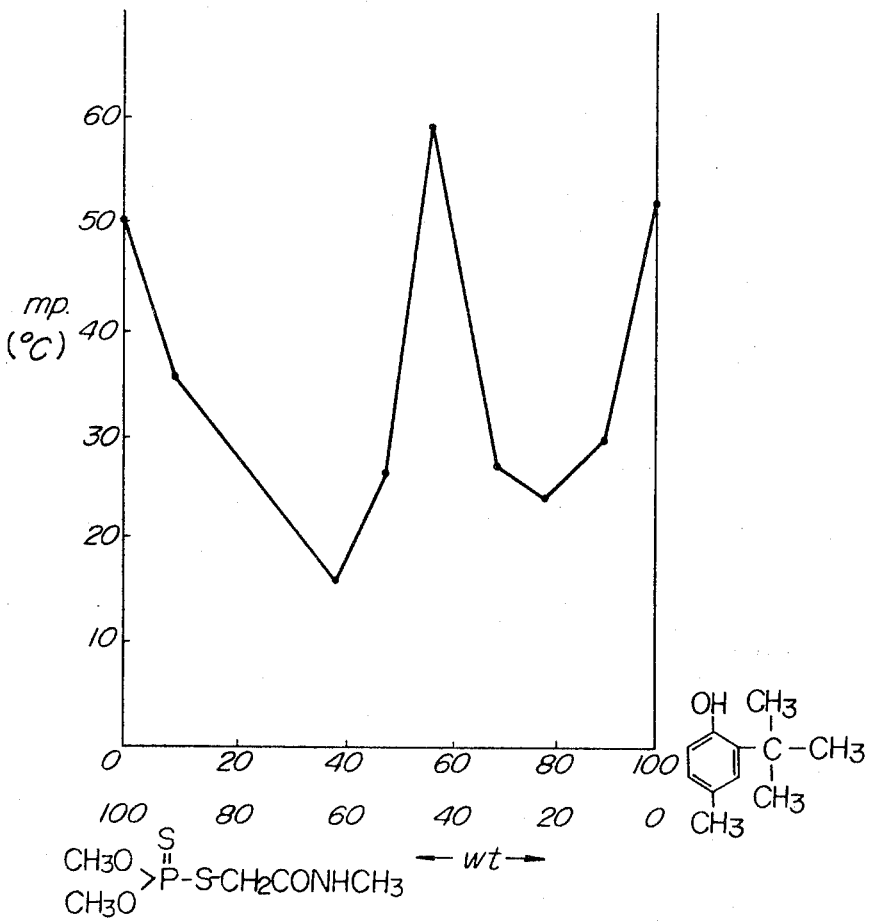

The equimolecular compound consisting of 4-methyl-2-tert.-butyl phenol and O,O-dimethyl N-methylcarbamoylmethyl dithiophosphate is advantageously employed for preparation of dust and wettable powder, because of having relatively high melting point. If desired, this compound obtained by contacting 6 mol of the said phosphate with 4 mol of the said alkyl phenol may be also employed for formulation of a liquid preparation such as oil preparation or paint, because of having relatively low melting point as is shown in FIG. 2.

The thus obtained molecular compounds of the present invention are characterized in having no undesirable odor as is found in O,O-dimethyl N-methylcarbamoylmethyl dithiophosphate. If desired, these compounds may be further purified by the recrystallization method using a hydrocarbon such as xylene and toluene, chlorinated hydrocarbon such as perchloroethylene or the like.

The alkyl phenol compounds employed in the present invention may be easily prepared from cresol or xylenol according to the conventional method, whose details will not be required by those skilled in the art. As already described above, the present invention is characterized in employing a novel molecular compound of O,O-dimethyl N-methylcarbamoylmethyl dithiophosphate as an active ingredient of household or agricultural pesticidal compositions. Furthermore, the present novel molecular compounds are characterized in having a good stability and an excellent compatibility with other agricultural chemicals and auxiliaries. Therefore, neither the particular conditions nor the special instructions would be required for the formulation of the present insecticidal compositions. Thus the present novel molecular compound can be easily formulated into dust, wettable powder, granule, emulsion or oil preparation according to various techniques which are well known in the art. For example, the present molecular compounds may be advantageously formulated with such solid carrier as clay, talc, kaolin and diatomaceous earth and such liquid carrier as xylene, kerosene, solvent naphtha, cyclohexanone, methyl ethyl ketone and perchloroethylene.

They can be also admixed with other insecticides, mitecides, nematocides, fungicides, herbicides and fertilizers at will. This invention can be further illustrated by the following examples of preferred embodiments thereof although it will be understood that these examples are included merely for purposes of illustration and are not intended to limit the scope of the invention.

Example 1

Three point three grams of 4-methyl-2-tert.-butyl phenol (M.P. 53° C.) was added to 4.6 g. of O,O-dimethyl N-methylcarbamoylmethyl dithiophosphate (M.P. 51° C.) in a mortar and the mixture was admixed homogeneously to make a uniform mixture. The mixture gradually lost its moisture and changed its color into white. The thus obtained white powder possessed a new melting point of 58° C., which was substantially different from those of said raw materials. X-ray diffraction spectrum of the powder was shown in FIG. 1, which apparently indicated that thus obtained product is a new compound and not a mere mechanical mixture of these ingredients.

FIG. 2 showed a correlation between the compounding ratio of both components and the melting point of thus obtained product. From this figure, it is clearly understood that a novel molecular compound can be obtained at the time of using an equimolar amount of O,O-dimethyl N-methylcarbamoylmethyl dithiophosphate and alkyl phenol.

The above mentioned product was recrystallized from xylene for analysis use. Thus, the product can be further purified by using recrystallization method with xylene or toluene to give highly pure, odorless crystals.

Example 2

Four point six grams of O,O-dimethyl N-methylcarbamoylmethyl dithiophosphate and 3.5 grams of 4-methoxy-2-tert.-butyl phenol were added with 6 cc. of xylene, and the mixture was heated at 45° C. to make a uniform solution. Upon cooling the solution to —5° C., 7.3 grams of white crystalline mass were obtained. The melting point of this product was 43–44° C. and the result of an elementary analysis thereof coincided with the calculation based on an equimolar composition of both components.

Example 3

Four point six grams of O,O-dimethyl N-methylcarbamoylmethyl dithiophosphate and 3 grams of 3-methyl-6-isopropyl phenol were dissolved in 5 cc. of xylene at 40° C., and the mixture was cooled to −5° C. to recover 6.0 grams of the crystalline mass (M.P. 33° C.). The elementary analysis data were identical with the calculation based on an equimolar composition of both components.

Example 4

This example illustrates a reduced water solubility of the present molecular compound, which results in a high residual effectiveness. Following Table 1 summarized the solubility data (percent by weight) of the compounds of Examples 1–3 in water and in xylene.

TABLE 1

| Solvent | Compound | Solubility (percent by weight) at— | |
|---|---|---|---|
| | | 13° C. | 32.5° C. |
| Water | $\begin{array}{c}CH_3O\\ \diagdown\\ CH_3O\end{array}\!\!P\!\!\begin{array}{c}\diagup\!\!S\\ \diagdown\!S-CH_2CONHCH_3\end{array}$ | 1.9 | 3.3 |
| Do | Product of Example 1 | 0.14 | 0.23 |
| Do | Product of Example 2 | 0.21 | 0.36 |

| Solvent | Compound | Solubility (percent by weight) at— | |
|---|---|---|---|
| | | 0° C. | 10° C. |
| Xylene | $\begin{array}{c}CH_3O\\ \diagdown\\ CH_3O\end{array}\!\!P\!\!\begin{array}{c}\diagup\!\!S\\ \diagdown\!S-CH_2CONHCH_3\end{array}$ | 2.4 | 3.3 |
| Do | Product of Example 1 | 6.0 | 15.2 |

As clearly known from the above Table 1, the molecular compounds of the present invention show a remarkable decrease in the solubility in water as compared with that of O,O-dimethyl N-methylcarbamoylmethyl dithiophosphate (i.e. almost one-tenth of the latter), but increase in the solubility in a nonpolar solvent as xylene. This diminished water solubility is a very desirable characteristic of the present molecular compound since a long acting insecticidial composition may be provided therewith.

The so-called systemic insecticide is usually applied to the soil and the toxicant is absorbed through the roots into a plant, whereby the whole plant body is toxicated for a desired period of time to prevent from the attack of an injurious insect.

However, since O,O - dimethyl N-methylcarbamoylmethyl dithiophosphate possesses a higher water solubility, it is easily washed away from the applied soil and hence it is ineffectual as a systemic insecticide. On the contrary, the diminished water solubility of the present molecular compound breaks a new ground for the application of the compound in this particular field.

The following Table 2 summarized the easiness for extracting the active ingredient with water from 5% granular composition. In this test, each 200 mg. of the granules (5% active ingredient and talc) were placed on a filter and washed with each 20 cc. of distilled water. After combining the washings, the extracted amounts of O,O-dimethyl N-methylcarbamoylmethyl dithiophosphate were analyzed.

TABLE 2

| Active ingredient | Water | | |
|---|---|---|---|
| | 20 cc. | 40 cc. | 60 cc. |
| $\begin{array}{c}CH_3O\\ \diagdown\\ CH_3O\end{array}\!\!P\!\!\begin{array}{c}\diagup\!\!S\\ \diagdown\!S-CH_2CONHCH_3\end{array}$ | 22% | 43% | 63% |
| Product of Example 1 | 8% | 17% | 25% |

The characteristics of relatively low washed-away ratio may be advantageously utilized to abridge or alleviate any complex processes in formulation.

Example 5

This example illustrates an excellent thermal stability of the present molecular compound. Thus, each 0.5 gram of O,O-dimethyl N-methylcarbamoylmethyl dithiopshosphate and each 0.5 gram of the present molecular compound were placed in a series of 2 cc. ampules separately. After sealing, these ampules were stored at 40° C., 60° C. and 110° C. for a predetermined period of time. The ampules were opened and thereafter the content of each ampule was developed by means of the thin layer chromatography using a silica gel and 1:1 mixed solvent of n-hexane and acetone and determined by using an infrared absorption spectrum method. These results were shown in Table 3.

TABLE 3.—THERMAL STABILITY, REMAINING PERCENT

| Compound | Start | 40° C., 1 month | 40° C., 2 months | 40° C., 3 months |
|---|---|---|---|---|
| A* | 99 | 97 | 91 | 84 |
| B** | 99 | 99 | 99 | 99 |
| | Start | 60° C., 5 days | 60° C., 10 days | 60° C., 15 days |
| A | 99 | 76 | 15 | 0 |
| B | 99 | 87 | 76 | 63 |
| | Start | 110° C., 1 hour | | |
| A | 99 | 72 | | |
| B | 99 | 92 | | |

*O,O-dimethyl N-methylcarbamoylmethyl dithiophosphate.
**Product of Example 1.

From this Table 3, it is apparent that the present novel compound possesses a superior thermal stability to the original O,O-dimethyl N-methylcarbamoylmethyl dithiophosphate.

According to the studies of the inventors, it has been found that the aforesaid stabilization effect is always found out in the atmosphere of being capable of maintaining the original composition of said molecular compound. For example, the present compound is very stable even in the presence of such mineral carrier as talc and clay, as shown in Table 4.

This finding is very important since O,O-dimethyl N-methylcarbamoylmethyl dithiophosphate is easily decomposed when it is formulated with such carriers. Thus, the present molecular compound can be freely admixed with talc or clay to make a stable composition such as dust and granular formulation.

The following Table 4 illustrates as excellent compatibility of the present compound with such mineral carriers. In this test, each 5% dust formulation was kept at 40° C. for a designated period of time, and thereafter the decomposed active ingredient was determined by using the same testing method as described hereinabove.

(Please refer to the test method of Table 3.)

TABLE 4

| Carrier | Compound | Decomposition rate (percent) | |
|---|---|---|---|
| | | 40° C., 1 month | 40° C., 2 months |
| Clay | O,O-dimethyl N-methylcarbamoylmethyl dithiophosphate. | 6.9 | 13.5 |
| Do | Product of Example 1 | 0.4 | 0.6 |
| Talc | O,O-dimethyl N-methylcarbamoylmethyl dithiophosphate. | 13.5 | 17.0 |
| Do | Product of Example 1 | 0.8 | 1.2 |

Example 6

This example illustrates a superior bactericidal activity of the present molecular compound toward *Staphylococcus aureus* and *Escherichia coli*.

Using a phenol as the control, the bactericidal activity of the present molecular compound was shown in Table 5. In this table, all figures were expressed in terms of dilution ratio of the sample in which the tested microorganisms were not killed in 5 minutes contact but killed in 10 minutes contact.

TABLE 5

| Sample | St. aureus | E. col |
|---|---|---|
| Phenol | ×80 | ×90 |
| Product of Example 1 | ×2,400 | ×1,000 |
| Product of Example 2 | ×900 | ×800 |
| Product of Example 3 | ×800 | ×900 |

As is apparent from the above Table 5, the molecular compound of the present invention generally possesses a strong bactericidal activity which is almost 10 times stronger toward *E. coli* and 10–30 times stronger toward *St. aureus* than the respective activity of the phenol. Thus, the novel molecular compound of the invention is useful not only as insecticides but also as disinfectants.

Example 7

Eighteen grams of the product of Example 1 were dissolved in a mixed solvent of 25 grams of cyclohexanone and 44 grams of kerosene, and 13 grams of the agricultural emulsifier Sorpol 2717 was added to the mixture, thereby to obtain an emulsion concentrate containing 10% of O,O-dimethyl N-methylcarbamoylmethyl dithiophosphate.

Example 8

Forty eight grams of the product of Example 1 was mixed with 42 grams of 300 mesh diatomaceous earth, 5 grams of white carbon and 5 grams of the agricultural emulsifier Sorpol 5029, thereby to obtain a wettable powder having a good water suspension ability.

Example 9

The emulsion concentrate of Example 7 was diluted with water and thus obtained 5 times diluted emulsion was coated on a surface of 15 cm. x 15 cm. plywood at the rate of 50 ml./m.$^2$.

A glass rink having a diameter of 10 cm. and being smeared with butter on the inside-wall thereof was placed on the board and 10 adult cockroaches (5 males and 5 females) were placed therein. After 60 minutes contact with said coated board, the cockroaches were transferred in a new vessel, fed and the mortality was checked after 3 days observation period. In order to determine the residual effect of the present composition, said plywood board was kept in a room adjusted at a temperature of 27° C. and a relative humidity of 50 and the mortality tests with elapse of time were repeated several times.

These results were shown in Table 6.

TABLE 6

| Composition | Dosage of O,O-dimethyl N-methylcarbamoyl-methyl dithio-phosphate, g./m.$^2$ | Mortality (percent) after spraying (days) | | | | |
|---|---|---|---|---|---|---|
| | | 0 | 7 | 14 | 24 | 34 | 50 |
| Emulsion of Example 7 | 1 | 100 | 100 | 100 | 100 | 100 | 20 |
| Control* | 1 | 100 | 100 | 100 | 70 | 50 | 10 |
| Do** | 1 | 100 | 100 | 100 | 100 | 100 | 10 |

*Emulsifiable concentrate of O,O-dimethyl N-methylcarbamoyl methyl dithiophosphate.
**Emulsifiable concentrate of O,O-dimethyl-O-(3-methyl-4-nitro phenyl) thiophosphate.

In each 500 ml. beaker, a culture bed comprising rice straw, fish powder, and dry yeast, was prepared and housefly larvae were respectively put on the beds kept in a thermostat at 27° C. and RH 60.

After 3 days later from the hatching of housefly eggs, each 1 ml. of diluted pesticidal compositions shown in Table 7 was respectively sprayed on the surface of the said individual culture bed and the mortality of larvae was observed 5 days later from said spraying. Still living pupae and larvae were placed in a culturing room and the emerged fly number were calculated.

These results were shown in Table 7.

TABLE 7

| Composition | Dilution with water* | Mortality (percent) of larvae | Emerged fly (percent) |
|---|---|---|---|
| Emulsion of Example 7 | ×200 | 98.9 | 0.2 |
| | ×1,000 | 97.5 | 1.3 |
| | ×5,000 | 92.9 | 6.8 |
| Wettable powder of Example 8. | ×200 | 98.6 | 0.3 |
| | ×1,000 | 98.5 | 0.4 |
| | ×5,000 | 96.4 | 3.4 |
| O,O-dimethyl N-methyl-carbamoymethyl dithio-phosphate emulsion. | ×200 | 96.2 | 0.3 |
| | ×1,000 | 94.4 | 2.1 |
| | ×5,000 | 90.2 | 3.5 |
| O,O-dimethyl-O-(3-methyl-4-nitro-phenyl) thiophos-phate emulsion. | ×200 | 97.4 | 2.2 |
| | ×1,000 | 76.8 | 20.3 |
| | ×5,000 | 8.2 | 87.5 |
| Non treatment | | 1.0 | 90.9 |

*Dilution is expressed by the "times of active ingredient."

Example 10

The molecular compound obtained in Example 1 and the control were respectively prepared to water emulsions by adding the agricultural emulsifier Sorpol 2001, which were applied to about 20 grams weights of mice (male) in an amount of 0.2 ml. per 10 grams of body weight and toxic symptoms were observed according to the lapse of time.

The acute oral LD$_{50}$ value was calculated according to the Litchfield & Wilcoxon method from mortality of duration of 72 hours.

These results were shown in Table 8.

TABLE 8

| Composition | The acute oral LD$_{50}$ value (mol/kg.) |
|---|---|
| Emulsion of Example 1 | 1.20×10$^{-3}$. |
| Control | 5.80×10$^{-4}$. |

What we claim is:
1. A molecular compound composed of O,O-dimethyl N-methylcarbamoylmethyl dithiophosphate and an alkyl phenol of the general formula

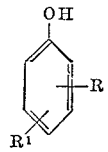

wherein R is a branched alkyl radical having 3 to 4 carbon atoms at the 2- or 6-position and R' is a methyl or methoxyl radical at the 3- or 4-position.

2. A molecular compound defined in claim 1, wherein the said alkyl phenol is 4-methyl-2-ter.butyl phenol.

3. A molecular compound defined in claim 1, wherein the said alkyl phenol is 4-methoxy-2-ter.butyl phenol.

4. A molecular compound defined in claim 1, wherein the said alkyl phenol is 3-methyl-6-isopropyl phenol.

References Cited

UNITED STATES PATENTS 3,203,854   8/1965   Bouillenne-Walrand et al.
                                           260—920 XR CHARLES B. PARKER, *Primary Examiner.*

ANTON H. SUTTO, *Assistant Examiner.*

U.S. Cl. X.R.

23—209.1; 264—43, 63